United States Patent
Nakamura et al.

(10) Patent No.: US 9,377,831 B2
(45) Date of Patent: Jun. 28, 2016

(54) VEHICLE ELECTRIC POWER DISTRIBUTION DEVICE

(75) Inventors: Yoshihide Nakamura, Susono (JP); Akinori Maruyama, Susono (JP); Yoshinori Ikuta, Susono (JP); Keisuke Ueta, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 608 days.

(21) Appl. No.: 13/991,434

(22) PCT Filed: Nov. 30, 2011

(86) PCT No.: PCT/JP2011/006708
§ 371 (c)(1),
(2), (4) Date: Jun. 4, 2013

(87) PCT Pub. No.: WO2012/077304
PCT Pub. Date: Jun. 14, 2012

(65) Prior Publication Data
US 2013/0253722 A1 Sep. 26, 2013

(30) Foreign Application Priority Data
Dec. 9, 2010 (JP) ................................. 2010-274371

(51) Int. Cl.
*G06F 1/26* (2006.01)
*B60R 16/023* (2006.01)
*B60R 16/03* (2006.01)

(52) U.S. Cl.
CPC .............. *G06F 1/26* (2013.01); *B60R 16/0232* (2013.01); *B60R 16/03* (2013.01)

(58) Field of Classification Search
None
See application file for complete search history.

(56) References Cited

U.S. PATENT DOCUMENTS

| 5,637,933 A | 6/1997 | Rawlings et al. |
| 6,144,110 A * | 11/2000 | Matsuda .................. H02J 9/04 307/10.1 |

(Continued)

FOREIGN PATENT DOCUMENTS

| CN | 101861689 A | 10/2010 |
| DE | 19811899 A1 | 9/1998 |

(Continued)

OTHER PUBLICATIONS

The Chinese office action letter issued on Dec. 22, 2014 in the counterpart Chinese patent application.

(Continued)

*Primary Examiner* — Robert Fennema
*Assistant Examiner* — Md N Mia
(74) *Attorney, Agent, or Firm* — Mots Law, PLLC

(57) ABSTRACT

An electric power distribution device sets a first threshold and a second threshold for a threshold temperature of main wires, and sets a third threshold and a fourth threshold for a threshold temperature of branch wires. In the case where a temperature of each of the main wires reaches the first threshold, all of branch wire switches provided in a branch wire distributor are shut off. Thereafter, in the case where the temperature of the main wire reaches the second threshold, each of the main wire switches, which is provided a main wire distributor, is shut off. In the case where a temperature of a certain branch wire reaches the third threshold, the corresponding branch wire switch is subjected to PWM control. Thereafter, in the case where the temperature of the branch wire reaches the fourth threshold, the corresponding branch wire switch is shut off.

6 Claims, 5 Drawing Sheets

(56) References Cited

U.S. PATENT DOCUMENTS

| | | |
|---|---|---|
| 6,369,460 B1 | 4/2002 | Endoh et al. |
| 2003/0075980 A1 | 4/2003 | Yoshida et al. |
| 2010/0254059 A1* | 10/2010 | Higuchi ............... G01K 3/005 361/103 |
| 2011/0080681 A1 | 4/2011 | Maruyama et al. |

FOREIGN PATENT DOCUMENTS

| | | |
|---|---|---|
| EP | 0279168 A2 | 8/1988 |
| EP | 0968884 A2 | 1/2000 |
| EP | 1046545 A2 | 10/2000 |
| JP | 2000-245055 A | 9/2000 |
| JP | 2001-160747 A | 6/2001 |
| JP | 2005-094930 A | 4/2005 |
| JP | 2009-120138 A | 6/2009 |
| JP | 2010-119261 A | 5/2010 |
| WO | 2009/151084 A1 | 12/2009 |

OTHER PUBLICATIONS

The Japanese official action issued on Aug. 12, 2014 in the counterpart Japan patent application. (Partial English translation also submitted.)

* cited by examiner

VEHICLE ELECTRIC POWER DISTRIBUTION DEVICE

TECHNICAL FIELD

The present invention relates to a vehicle electric power distribution device for supplying electric power of a battery mounted on a vehicle to loads connected to a plurality of branch electric wires by distributing the electric power to the branch electric wires.

BACKGROUND ART

Electric power outputted from a battery mounted on a vehicle is supplied once, for example, to a main electric wire distributor mounted in an engine room or the like, and is then supplied to a plurality of branch electric wire distributors, which are installed at appropriate spots in the vehicle, through a plurality of main electric wires branched from the main electric wire distributor. Moreover, the electric power supplied to the respective branch electric wire distributors is supplied to a variety of loads such as a motor and a lamp, which are mounted on the vehicle, through the plurality of branch electric wires, and the variety of loads are driven.

Moreover, the main electric wire distributor includes an electronic switch such as a semiconductor switch and a contact-type relay for each of the main electric wires. In the case where an overcurrent is generated in such a main electric wire, the main electric wire distributor shuts off this electronic switch, and thereby protects the main electric wire and an entire circuit on a downstream side thereof from a temperature rise owing to the overcurrent.

In a similar way, each of the branch electric wire distributors includes an electronic switch such as a semiconductor switch for each of the branch electric wires. In the case where an overcurrent is generated in such a branch electric wire owing to a short circuit accident of the load, and the like, the branch electric wire distributor shuts off this electronic switch, and thereby protects the branch electric wire and the load connected to the branch electric wire from a temperature rise owing to the overcurrent.

As a conventional example of an electric power distribution device provided with such an overcurrent protection function, a technology disclosed in PTL 1 has been known. PTL 1 describes such a technology for supplying electric power to a variety of loads mounted in a vehicle in such a manner an output end of a battery mounted on the vehicle is connected to a power supply distributor, further, a plurality of interior power supply distributors are connected to a plurality of main electric wires branched by the power supply distributor, and the loads are connected to a plurality of branch electric wires branched by the respective interior power supply distributors.

Moreover, in the case where an overcurrent is detected in the main electric wire or the branch electric wire, the electronic switches of the power supply distributor and the respective interior power supply distributors are shut off, whereby the entire circuit can be protected from the temperature rise owing to the overcurrent.

CITATION LIST

Patent Literature

[PTL 1]
JP 2009-120138 A

SUMMARY OF INVENTION

However, in the above-mentioned conventional example disclosed in PTL 1, in the case where the overcurrent is detected, all of the electronic switches of the power supply distributor and the plurality of interior power supply distributors provided on the downstream side thereof are shut off, and accordingly, all of the loads mounted in the vehicle are stopped. Hence, a motor for driving a radiator fan and a motor for driving a fuel pump are stopped, and there occurs a problem that it becomes impossible to run the vehicle. Moreover, the example concerned has a configuration of shutting off the electronic switches when a flowing current becomes the overcurrent, and accordingly, there has been a problem that the electronic switches are erroneously shut off by being affected by noise and the like.

The present invention has been made in order to solve the conventional problems as mentioned above. It is an object of the present invention to provide a vehicle electric power distribution device, which is capable of appropriately controlling operations of the respective electronic switches in response to a degree of the overcurrent flowing through the main electric wires and the branch electric wires, and is capable of preventing an occurrence of the erroneous shutoff.

In order to achieve the forgoing object, a vehicle electric power distribution device according to a first aspect of the present invention is a device for distributing electric power of a battery to a plurality of branch electric wires and supplying the electric power to loads connected to subsequent stages of the respective branch electric wire, and the device includes: a main electric wire distributor; a branch electric wire distributor; and a communication line. The main electric wire distributor is a distributor for distributing, to a plurality of main electric wires, the electric power supplied from a DC power supply, the distributor being connected to the DC power supply. The main electric wire distributor includes: first current sensors for detecting currents flowing through the respective main electric wires; first switches for switching connection and shutoff of the respective main electric wire; and a first control unit for estimating a temperature of each of the main electric wires by the current detected by each of the first current sensors, and controlling each of the first switches based on the estimated temperature. The branch electric wire distributor is a distributor for distributing the electric power to the plurality of branch electric wires, the distributor being connected to the respective main electric wires. The branch electric wire distributor includes: second current sensors for detecting currents flowing through the respective branch electric wires; second switches for switching connection and shutoff of the respective branch electric wires; and a second control unit for estimating a temperature of each of the branch electric wires by the current detected by each of the second current sensors, and controlling each of the second switches based on the estimated temperature. The communication line performs communication between the first control unit and the second control unit. The first control unit sets a second threshold value that defines an upper limit temperature of the main electric wires, and a first threshold value as a value lower than the second threshold value. In a case where the estimated temperature of each of the main electric wires exceeds the first threshold value, the first control unit transmits a forcible shutoff signal to the second control unit. In a case where the estimated temperature of each of the main electric wires exceeds the second threshold value, the first control unit performs control to shut off each of the first switches. The second control unit sets a fourth threshold value that defines an upper limit temperature of the branch electric wires, and a third threshold value lower than the fourth threshold value. In a case where the estimated temperature of each of the branch electric wires exceeds the third threshold value, the second control unit performs electric power reduction control for each of the second switches and supplies the electric power to each of the branch electric wires. In a case where the estimated temperature of each of the branch electric wires exceeds the fourth threshold value, or in a case where the forcible shutoff signal is transmitted, the second control unit shuts off each of the second switches.

For the electric power reduction control, there can be used PWM control to supply the electric power to the branch electric wires in a desired duty ratio.

The second control unit may reduce the duty ratio with elapse of a time at a time of implementing the PWM control.

In the case where the estimated temperature of each of the branch electric wires exceeds the fourth threshold value, preferably, the second control unit transmits a branch electric wire abnormality signal to the first control unit, and in a case of receiving the branch electric wire abnormality signal, preferably, the second control unit lowers the first threshold value and the second threshold value.

In the vehicle electric power distribution device according to the first aspect of the present invention, in the case where the current flowing through the main electric wire is increased, and the estimated temperature of the main electric wire reaches the first threshold value, all of the second switches connected to the branch electric wires are shut off. In the case where the estimated temperature of the main electric wire further rises thereafter to reach the second threshold value, the first switch connected to the main electric wire is shut off. Hence, in the case where the estimated temperature of the main electric wire is gradually increased, all of the second switches are first shut off and thereafter, the first switch is shut off. Therefore, the respective loads connected to the branch electric wires can be surely turned to an OFF state.

Moreover, in the case where a current flowing through a certain branch electric wire is increased, and an estimated temperature thereof reaches the third threshold value, then the second switch of the branch electric wire concerned is subjected to the electric power consumption reduction control. Therefore, the electric power to be supplied to the branch electric wire concerned can be reduced, and accordingly, a temperature rise of the branch electric wire concerned can be suppressed. Hence, a time until the load is shut off can be extended. Thereafter, in the case where the estimated temperature further rises to reach the fourth threshold value, the second switch of the branch electric wire concerned is shut off. Therefore, the branch electric wire can be surely protected.

Furthermore, the PWM control is used as the electric power consumption reduction control, and further, the duty ratio is controlled so as to be gradually reduced with the elapse of the time, whereby the temperature rise of the branch electric wire, which follows the elapse of the time, can be further suppressed.

Moreover, in the case where the estimated temperature of the branch electric wire reaches the fourth threshold value, the first threshold value and the second threshold value are changed to the lower values, whereby the main electric wire will be shut off at a lower temperature. Therefore, the main electric wire can be surely protected from the overheat.

DESCRIPTION OF EMBODIMENTS

A description is made below of embodiments of the present invention based on the drawings.

Figure 1:
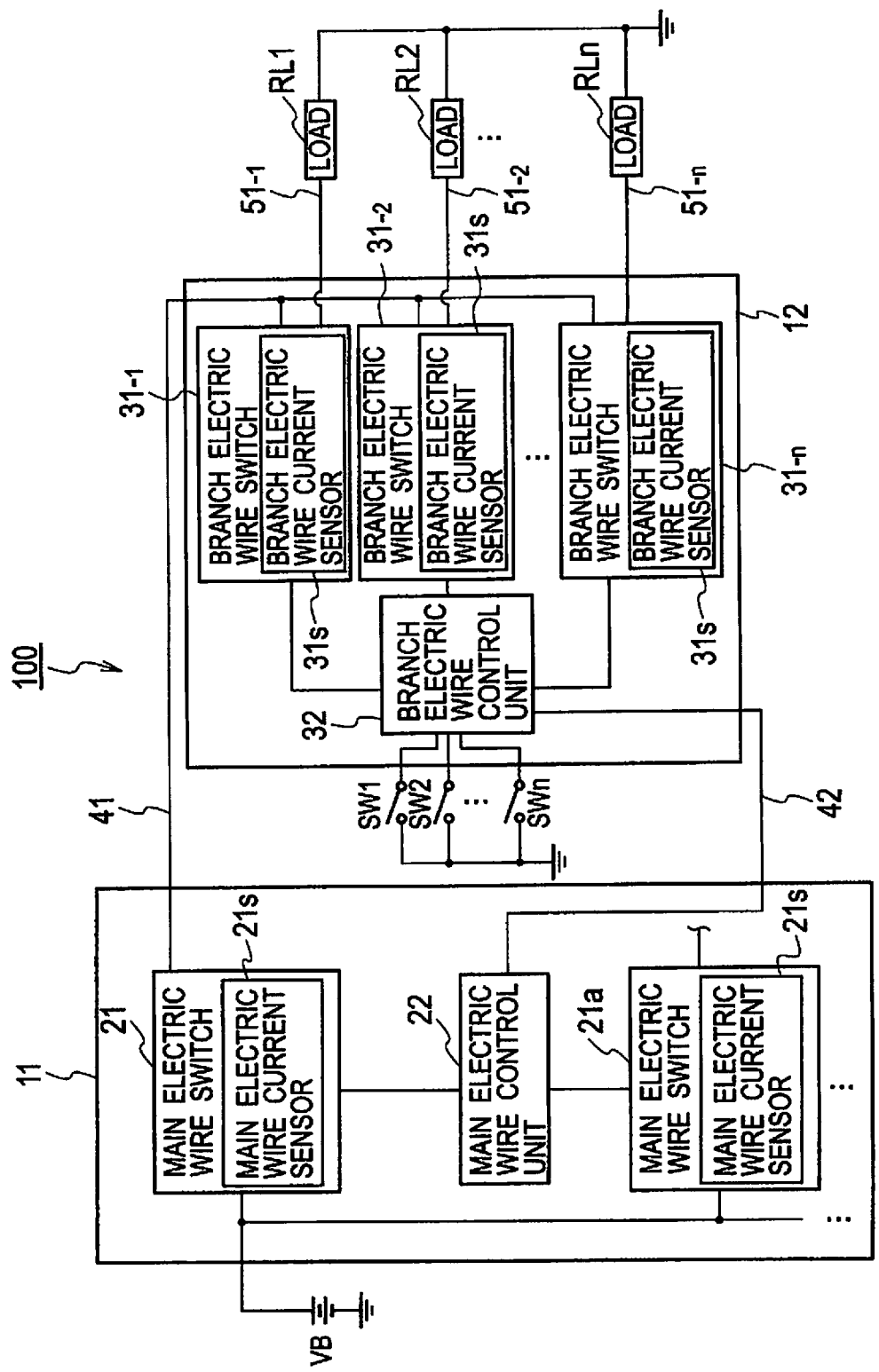
FIG. 1 is a block diagram illustrating a configuration of a vehicle electric power distribution device according to an embodiment.

As illustrated in FIG. 1, a vehicle electric power distribution device 100 according to an embodiment includes: a main electric wire distributor 11 connected to a positive-side terminal of a battery VB; and a plurality of branch electric wire distributors 12 (only one thereof is illustrated in FIG. 1) connected to a plurality of main electric wires 41 (only one thereof is illustrated in FIG. 1) branched by the main electric wire distributor 11.

The main electric wire distributor 11 includes: a plurality of main electric wire switches (first switches) 21 (only two main electric wire switches 21 and 21a are illustrated in FIG. 1); and a main electric wire control unit (first control unit) 22 that controls ON and OFF of each of the main electric wire switches 21.

Each of the main electric wire switches 21 is, for example, a semiconductor element, and includes a main electric wire current sensor (first current sensor) 21S that detects a current flowing through each of the main electric wire switches 21. The main electric wire switch 21 turns on in the case where a drive signal is outputted from the main electric wire control unit 22, and turns off in the case where such output of the drive signal is stopped. For such a main electric wire current sensor 21S, for example, there can be employed one of a type using a shunt resistor, and one of a type using a multi-source FET.

The main electric wire control unit 22 performs processing for estimating a temperature of the main electric wire 41 based on a value of the current detected by the main electric wire current sensor 21S and on an elapsed time. For such estimation processing for the current wire temperature, a method described in WO 2009/151084 A1 can be employed.

When current is flowing through the main electric wire 41, an amount of heat X1 generated by the main electric wire 41 per unit length is expressed by the following equation (1).

$$X1 = I^2 Ron\, dt \quad (1)$$

Herein, I is current detected by the main electric wire current sensor 21S; Ron, resistance per unit length of the main electric wire 41; and dt, sampling time (dt is 5 msec, for example).

An amount of heat Y1 released from the main electric wire 41 per unit length can be expressed by the following equation (2).

$$Y1 = Q/(Cth*Rth/dt) \quad (2)$$

Herein, Cth* is pseudo-thermal capacity of the electric wire (thermal capacity set smaller than real thermal capacity); Rth, thermal resistance of the electric wire per unit length; and Q, an amount of heat of the electric wire per unit length (wire temperature multiplied by Cth*).

Electric wire temperature measured at current sampling Tn can be expressed by the following equation (3) where the electric wire temperature measured at previous sampling is Tp (ambient temperature initially).

$$Tn = Tp + (X1 - Y1)/Cth^* \quad (3)$$

Then, in the case where a smoking temperature (for example, 150 degrees Celsius) of the main electric wire 41 is set as a threshold temperature (Tth2 as a second threshold value to be described later) taken as a condition for shutting off the main electric wire switch 21, and the electric wire temperature Tn obtained by equation (3) reaches the threshold temperature Tth2, then the main electric wire switch 21 is controlled to be shut off. In such a case, the main electric wire switch 21 can be surely shut off at the point of time before the main electric wire 41 smokes. That is to say, the electric wire temperature Tn is arithmetically operated by using the pseudo-thermal capacity "Cth*", and accordingly, in the case where the electric wire temperature Tn reaches the threshold temperature Tth2, the actual temperature of the main electric wire 41 is a temperature lower than the threshold temperature Tth2. Hence, the main electric wire switch 21 is shut off at the point of time before the main electric wire 41 smokes, and overheat of the main electric wire 41 is prevented.

The main electric wire control unit 22 sets the threshold temperature as such a second threshold value Tth2 as described above, and further, sets a temperature lower than the second threshold value Tth2 as a first threshold value Tth1. At this time, the first threshold value Tth1 and the second threshold value Tth2 may be initially set based on a diameter of the main electric wire 41, or may be appropriately set by an input operation of a user. Then, as will be described later, in the case where an overcurrent flows through the main electric wire 41, and the temperature of the main electric wire 41 reaches the first threshold value Tth1, then the main electric wire control unit 22 changes a forcible shutoff signal, which is transmitted via a communication line 42 to a branch electric wire control unit (second control unit) 32 of the branch electric wire distributor 12, from Lo to Hi. That is to say, the main electric wire control unit 22 performs control to transmit the forcible shutoff signal to the branch electric wire control unit 32 of the branch electric wire distributor 12.

Moreover, in the case where the temperature further rises and reaches the second threshold value Tth2, the main electric wire control unit 22 stops the drive signal outputted to the main electric wire switch 21. That is to say, in the case where the estimated temperature of the main electric wire 41 reaches the second threshold value Tth2, the main electric wire control unit 21 turns off the main electric wire switch 32, and performs control to stop supply of the electric power to the main electric wire 41.

Furthermore, in the case where a branch electric wire abnormality signal to be transmitted from the branch electric wire control unit 32 of the branch electric wire distributor 12 is shifted from Lo to Hi (details will be described later), the main electric wire control unit 22 changes the above-mentioned first threshold value Tth1 and second threshold value Tth2 individually to threshold values lower than usual by preset temperatures. These are represented as a modified first threshold value Tth1' (Tth1'<Tth1) and a modified second threshold value Tth2' (Tth2'<Tth2).

The branch electric wire distributor 12 includes: a plurality (illustrated as n pieces in FIG. 1) of branch electric wire switches (second switches) 31-1 to 31-n; and the branch electric wire control unit (second control unit) 32. The respective electric wire switches 31-1 to 31-n are connected to loads RL1 to RLn through branch electric wires 51-1 to 51-n, respectively. The branch electric wire control unit 32 is connected to input control switches SW1 to SWn which operate drive and stop of the respective loads RL1 to RLn.

The respective electric wire switches 31-1 to 31-n are, for example, semiconductor elements, and each thereof includes a branch electric wire current sensor (second current sensor) 31S that detects a current flowing through one of the branch electric wire switches 31-1 to 31-n, which corresponds thereto. Then, the respective branch electric wire switches 31-1 to 31-n are turned on in the case where the drive signal is outputted from the main electric wire control unit 22, and are turned off in the case where the output of the drive signal is stopped. Note that, as each of the branch electric wire current sensors 31S, for example, there can be employed one of a type using a shunt resistor, and one of a type using a multi-source FET.

Based on the currents detected by the respective branch electric wire switches 31-1 to 31-n, the branch electric wire control unit 32 arithmetically operates the temperatures of the branch electric wires 51-1 to 51-n by such a temperature estimation logic in equations (1) to (3). The branch electric wire control unit 32 sets a fourth threshold value Tth4, which defines an upper limit temperature of the branch electric wires 51-1 to 51-n, and a third threshold value Tth3 lower than the fourth threshold value Tth4. Then, for example, in the case where the overcurrent flows through the branch electric wire 51-1, and the temperature of the branch electric wire 51-1 reaches the third threshold value Tth3, then the branch electric wire control unit 32 performs PWM control (electric power consumption reduction control) for the branch electric wire switch 31-1 in a desired duty ratio. As a result, the current flowing through the branch electric wire 51-1 is reduced, and heat generation of the electric wire is suppressed.

In the case where the temperature of the branch electric wire 51-1 further rises from the third threshold value Tth3 and reaches the fourth threshold value Tth4, the branch electric wire control unit 32 changes the branch electric wire abnormality signal, which is to be transmitted via the communication line 42 to the main electric wire control unit 22 of the main electric wire distributor 11, from Lo to Hi. That is to say, the branch electric wire control unit 32 performs control to transmit the branch electric wire abnormality signal via the communication line 42. Moreover, the branch electric wire control unit 32 outputs a shutoff signal to the branch electric wire switch 31-1 to turn off the branch electric wire switch 31-1, and performs control to stop supply of the electric power to the branch electric wire 51-1 and the load RL1.

Figure 2:
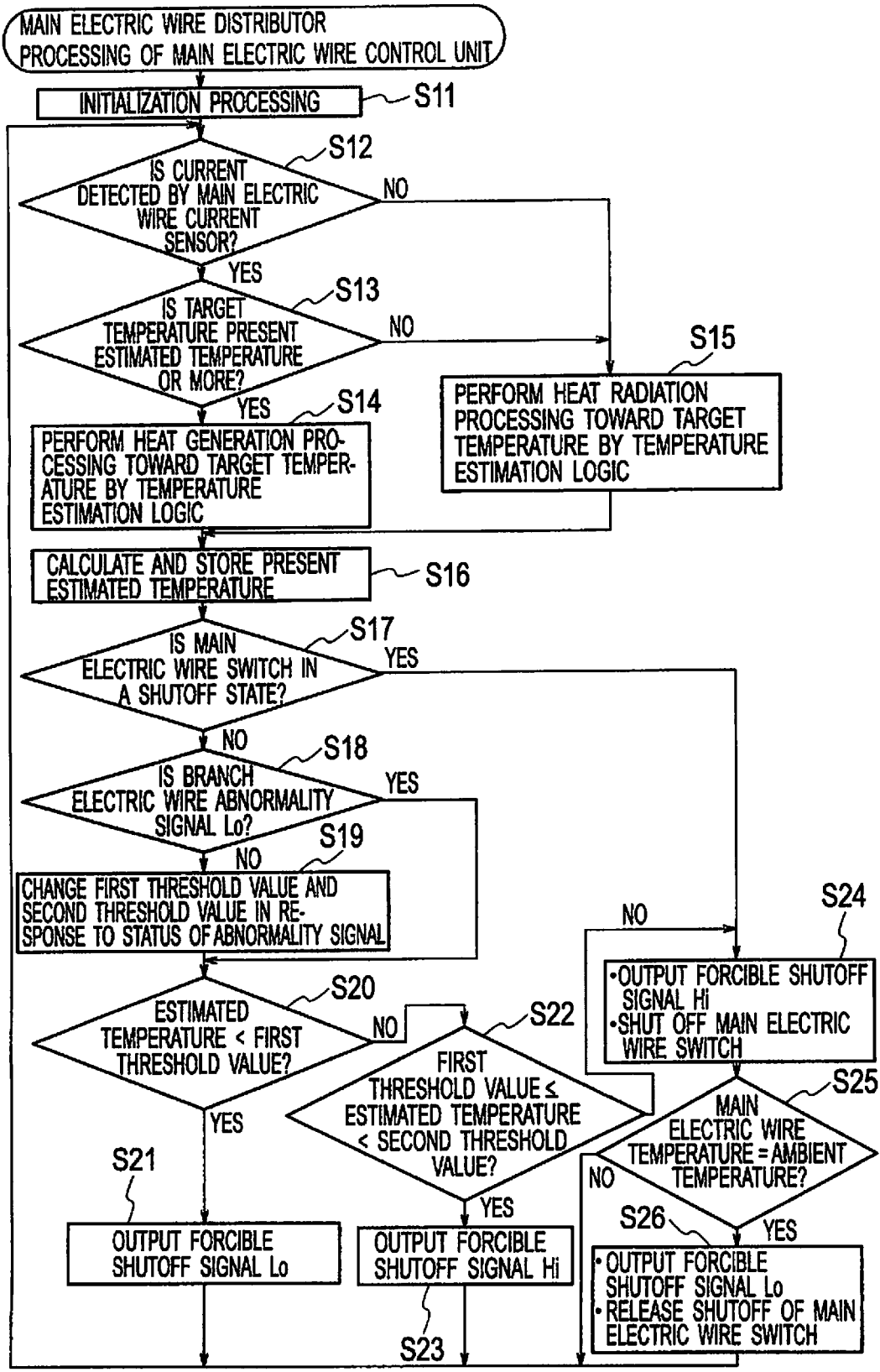
FIG. 2 is a flowchart illustrating control operations of a main electric power distributor mounted on the vehicle electric power distribution device according to the embodiment.
Figure 3:
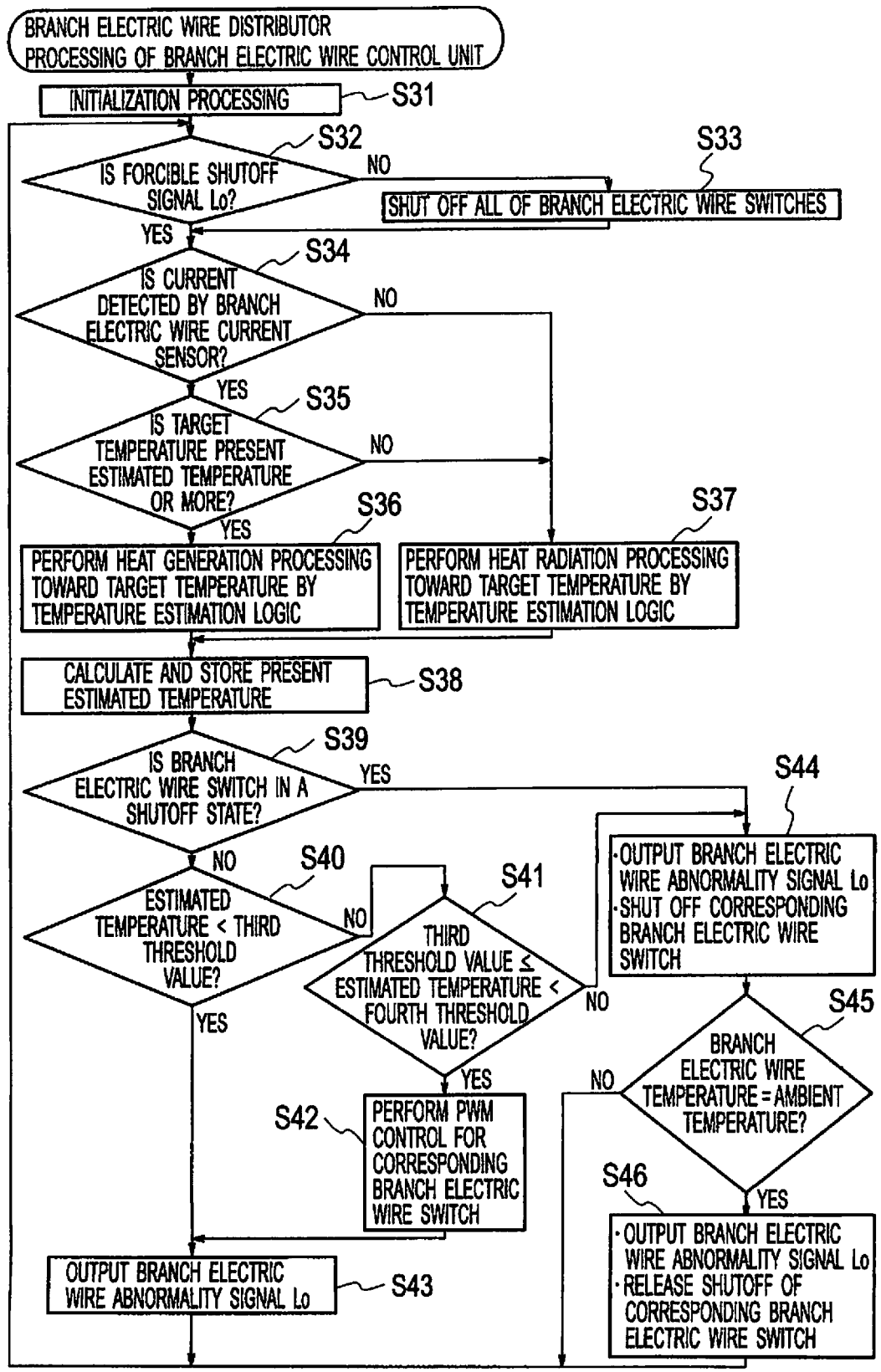
FIG. 3 is a flowchart illustrating control operations of a branch electric power distributor mounted on the vehicle electric power distribution device according to the embodiment.

Next, a description is made of operations of the vehicle electric power distribution device 100 according to this embodiment, which is configured as mentioned above. FIG. 2 is a flowchart illustrating a processing procedure by the main electric wire control unit 22 provided in the main electric wire distributor 11, and FIG. 3 is a flowchart illustrating a processing procedure by the branch electric wire control unit 32 provided in the branch electric wire distributor 12.

A description is made below of the processing procedure by the main electric wire control unit 22, which is provided in the main electric wire distributor 11, with reference to the flowchart illustrated in FIG. 2. First, in Step S11, the main electric wire control unit 22 is subjected to initialization processing. In this processing, an estimated rising temperature of the main electric wire 41 is set to 0 degree Celsius, the forcible shutoff signal to be transmitted to the branch electric wire control unit 32 of the branch electric wire distributor 12 is set to Lo, and the branch electric wire abnormality signal to be transmitted from the branch electric wire control unit 32 of the branch electric wire distributor 12 is set to Lo. Moreover, the first threshold value Tth1 and the second threshold value Tth2 are set to desired temperatures.

In Step S12, the main electric wire control unit 22 determines whether or not the current is detected in the main electric wire current sensor 21S installed in each of the main electric wire switches 21. In the case where the current is detected, the processing proceeds to Step S13. In the case where the current is not detected, the processing proceeds to Step S15.

In Step S13, the main electric wire control unit 22 determines whether or not a target temperature (saturation temperature) of the main electric wire 41 when the current detected in the main electric wire current sensor 21S continuously flows through the main electric wire 41 is the estimated temperature of the present moment or more. In this processing, by the temperature estimation logic in equations (1) to (3), the temperature of the main electric wire 41 is estimated every predetermined sampling time, and it is determined whether or not this estimated temperature reaches the target temperature. In the case where it is determined that the target temperature is the estimated temperature of the present moment or more, the main electric wire 41 generates heat from now on, and accordingly, the processing proceeds to Step S14. In the case where the target temperature is less than the estimated temperature of the present moment, the main electric wire 41 radiates heat from now on, and accordingly, the processing proceeds to Step S15.

In Step S14, by the above-mentioned temperature estimation logic, the main electric wire control unit 22 executes heat generation processing toward the target temperature. That is to say, in the case where the target temperature is higher than the present estimated temperature, the temperature of the main electric wire 41 rises in such a manner that the current flows through the main electric wire 41, and accordingly, the main electric wire control unit 22 executes the heat generation processing. Thereafter, the processing proceeds to Step S16.

In Step S15, by the above-mentioned temperature estimation logic, the main electric wire control unit 22 executes heat radiation processing toward the target temperature. That is to say, in the case where the current does not flow through the main electric wire 41 (in the case of NO in Step S12), or in the case where the estimated temperature of the present moment is higher than the target temperature when the current flows therethrough (in the case of NO in Step S13), the temperature of the main electric wire 41 is lowered, and accordingly, the main electric wire control unit 22 executes the heat radiation processing. Thereafter, the processing proceeds to Step S16.

In Step S16, the main electric wire control unit 22 calculates the present estimated temperature, and stores the present estimated temperature in a memory (not illustrated) and the like. In such a way, the present temperature of the main electric wire 41 can be estimated.

Thereafter, in Step S17, the main electric wire control unit 22 determines whether or not the main electric wire switch 21 provided in the main electric wire distributor 11 is in a shutoff state. In the case where the main electric wire switch 21 is not in the shutoff state (in the case where the main electric wire switch 21 is in a connection state), the processing proceeds to Step S18. In the case where the main electric wire switch 21 is in the shutoff state, the processing proceeds to Step S24.

In Step S18, the main electric wire control unit 22 determines whether or not the branch electric wire abnormality signal, which is to be transmitted via the communication line from the branch electric wire control unit 32 of the branch electric wire distributor 12, is Lo. In this processing, as will be described later, the branch electric wire control unit 32 of the branch electric wire distributor 12 changes the branch electric wire abnormality signal from Lo to Hi in the case where, in any of the branch electric wires 51-1 to 51-$n$, the electric wire temperature rises to reach the fourth threshold value Tth4. Hence, the branch electric wire abnormality signal becomes Hi in the case where the electric wire temperature of any of the branch electric wires 51-1 to 51-$n$ reaches the fourth threshold value Tth4. In the case where the branch electric wire temperature abnormality signal is Hi, the processing proceeds to Step S19. In the case where the branch electric wire abnormality signal is Lo, the processing proceeds to Step S20.

In Step S19, the main electric wire control unit 22 changes the first threshold value Tth1 and the second threshold value Tth2. That is to say, the main electric wire control unit 22 changes the first threshold value Tth1 and the second threshold value Tth2 to the modified first threshold value Tth1' and the modified second threshold value Tth2', which are lower than usual by predetermined amounts. Hence, in the main electric wire distributor 11, the first threshold value Tth1 is changed to the modified first threshold value Tth1', whereby the forcible shutoff signal is changed from Lo to Hi at a lower temperature, and in addition, the second threshold value Tth2 is changed to the modified second threshold value Tth2', whereby the main electric wire switch 21 is shut off at a lower temperature.

In this processing, in the case where the branch electric wire abnormality signal becomes Hi in at least one of the plurality of branch electric wire switches 31-1 to 31-$n$ provided in the branch electric wire distributor 12, the first threshold value Tth1 and the second threshold value Tth2 may be changed to the modified first threshold value Tth1' and the modified second threshold value Tth2'. Alternatively, in the case where the branch electric wire abnormality signal becomes Hi in at least one of preset ones among the plurality of branch electric wire switches 31-1 to 31-$n$, the first threshold value Tth1 and the second threshold value Tth2 may be changed to the modified first threshold value Tth1' and the modified second threshold value Tth2'. It is possible to arbitrarily set such a condition for changing the first threshold value Tth1 and the second threshold value Tth2 to the modified first threshold value Tth1' and the modified second threshold value Tth2'.

In Step S20, the main electric wire control unit 22 determines whether or not the estimated temperature of the main electric wire 41 is lower than the first threshold value (Tth1 or Tth1'). In the case where it is determined that the estimated temperature is lower, the processing proceeds to Step S21, and in the case where it is not determined that the estimated temperature is lower (in the case where the estimated temperature is higher), the processing proceeds to Step S22.

In Step S21, the main electric wire control unit 22 sets, to Lo, the forcible shutoff signal to be outputted to the branch electric wire control unit 32 of the branch electric wire distributor 12. Hence, with regard to those which are turned on among the respective branch electric wire switches 31-1 to 31-$n$ provided in the branch electric wire distributor 12, ON states thereof are maintained, and the supply of the electric power to the respective loads RL1 to RLn is allowed to continue via the branch electric wires 51-1 to 51-$n$.

In Step S22, the main electric wire control unit 22 determines whether or not the estimated temperature of the main electric wire 41 is higher than the first threshold value (Tth1 or Tth1') and is lower than the second threshold value (Tth2 or Tth2'). In the case where it is determined that the estimated temperature is within this range, the processing proceeds to Step S23, and in the case where it is not determined that the estimated temperature is not within this range (in the case where it is determined that the estimated temperature is higher than the second threshold value (Tth2 or Tth2')), the processing proceeds to Step S24.

In Step S23, the main electric wire control unit 22 sets, to Hi, the forcible shutoff signal to be outputted to the branch electric wire control unit 32 of the branch electric wire distributor 12. As a result, as illustrated in Step S33 of FIG. 3 to be described later, control to shut off the respective branch electric wire switches 31-1 to 31-n is performed under control of the branch electric wire control unit 32.

In Step S24, the main electric wire control unit 22 sets, to Hi, the forcible shutoff signal to be outputted to the branch electric wire control unit 32 of the branch electric wire distributor 12, and turns off the main electric wire switch 21 of the main electric wire distributor 11. Hence, the control to shut off the respective branch electric wire switches 31-1 to 31-n is performed under control of the branch electric wire control unit 32, and in addition, the main electric wire switch 21 is turned off by the control of the main electric wire control unit 22.

In Step S25, the main electric wire control unit 22 determines whether or not the temperature of the main electric wire 41 and the ambient temperature are equal to each other. In the case where it is determined that both of the temperatures are not equal to each other (NO in Step S25), the processing returns to Step S12. In the case where it is determined that both of the temperatures are equal to each other (YES in Step S25), the processing proceeds to the processing of Step S26.

In Step S26, the main electric wire control unit 22 sets the forcible shutoff signal to Lo, and releases the shutoff of the main electric wire switch 21 of the main electric wire distributor 11. Hence, the main electric wire distributor 11 and the branch electric wire distributor 12 operate as usual.

Figure 4:
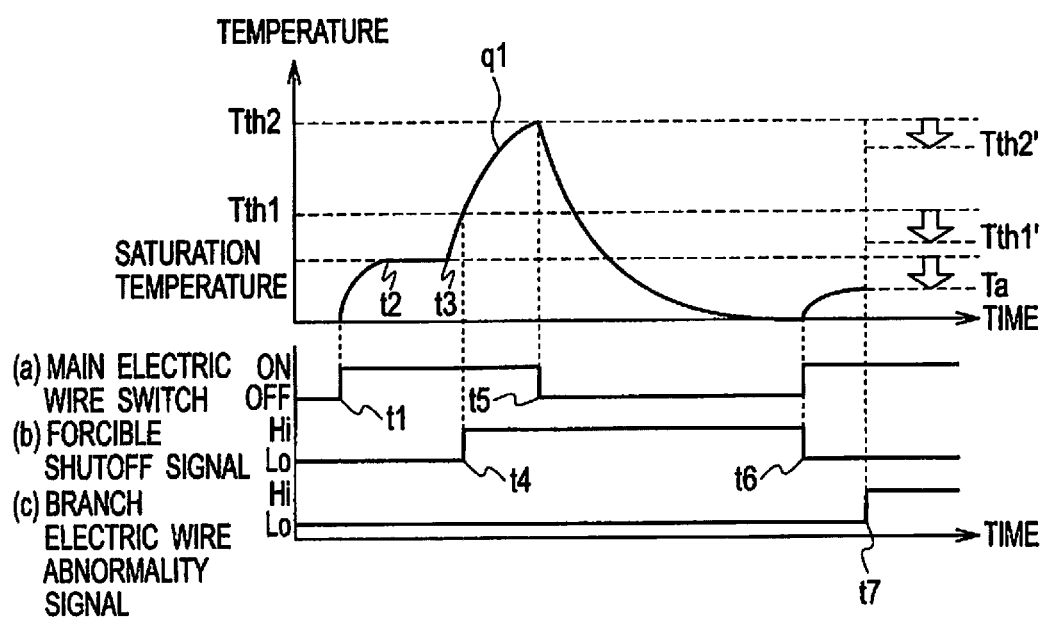
FIG. 4 is a timing chart illustrating operations of respective instruments when an overcurrent flows through the main electric wire mounted on the vehicle electric power distribution device according to the embodiment.

Next, a description is made of operations of the main electric wire control unit 22 and main electric wire switch 21 of the main electric wire distributor 11 with reference to a timing chart illustrated in FIG. 4. As illustrated in a waveform (a) of FIG. 4, when the main electric wire switch 21 is turned on at a time t1, a load current flows through the main electric wire 41, and the temperature of the main electric wire 41 starts to rise (refer to a curve q1). When the temperature of the main electric wire 41 reaches the saturation temperature at a time t2, the temperature concerned is stabilized at the saturation temperature. The saturation temperature does not reach the first threshold value Tth1, and accordingly, the forcible shutoff signal becomes Lo (refer to Step S21 of FIG. 2).

Thereafter, at a time t3, a short circuit accident or the like of the main electric wire 41 occurs, and the current flowing through the main electric wire 41 is suddenly increased. Then, following this, the temperature of the main electric wire 41 rises. As a result, at a time t4, the estimated temperature of the main electric wire 41 reaches the first threshold value Tth1. Then, as illustrated in a waveform (b) of FIG. 4, the forcible shutoff signal is switched from Lo to Hi (refer to Step S23 of FIG. 2). Then, the forcible shutoff signal of Hi is transmitted to the branch electric wire control unit 32 of the branch electric wire distributor 12. Then, the respective branch electric wire switches 31-1 to 31-n are shut off by the control of the branch electric wire control unit 32.

Then, when the time further elapses, the temperature of the main electric wire 41 rises, and reaches the second threshold value Tth2 at a time t5. Then, the shutoff signal is transmitted to the main electric wire switch 21 of the main electric wire distributor 11. Thereafter, the main electric wire switch 21 is shut off.

Moreover, after the main electric wire switch 21 is turned off, the heat radiation processing that follows the elapse of the time is performed, and the main electric wire 41 reaches the ambient temperature at a time t6. Then, the forcible shutoff signal is switched from Hi to Lo. Hence, in the branch electric wire distributor 12, the drive of the respective branch electric wire switches 31-1 to 31-n can be started (refer to Step S26 of FIG. 2). Moreover, the main electric wire switch 21 is turned on, and the temperature of the main electric wire 41 starts to rise (refer to the curve q1).

Moreover, at a time t7, in the case where the branch electric wire abnormality signal is transmitted from the branch electric wire distributor 12 (in the case where the branch electric wire abnormality signal becomes Hi), there is performed such processing for changing the first threshold value Tth1 and the second threshold value Tth2 to the modified first threshold value Tth1' and the modified second threshold value Tth2' (refer to Step S19 of FIG. 2). Hence, after the branch electric wire abnormality signal is transmitted, the saturation temperature Ta of the main electric wire 41 becomes lower than a usual saturation temperature, and in addition, the first threshold value Tth1 and the second threshold value Tth2 are set to the modified first threshold value Tth1' and the modified second threshold value Tth2', which are low temperatures. Accordingly, in the case where the overcurrent occurs, the forcible shutoff signal can be switched from Lo to Hi at an earlier point of time, and further, the main electric wire switch 21 can be shut off at an earlier point of time. Note that, in the case where the branch electric wire abnormality signal is changed from Hi to Lo, the modified first threshold value Tth1' and the modified second threshold value Tth2' return to the first threshold value Tth1 and the second threshold value Tth2, which are usual temperatures.

Next, a description is made of the processing procedure by the branch electric wire control unit 32, which is provided in the branch electric wire distributor 12, with reference to the flowchart illustrated in FIG. 3. First, in Step S31, the branch electric wire control unit 32 performs initialization processing. In this processing, an estimated rising temperature of the branch electric wires 51-1 to 51-n is set to 0 degree Celsius, the branch electric wire abnormality signal to be transmitted to the main electric wire control unit 22 of the main electric wire distributor 11 is set to Lo, and the forcible shutoff signal to be transmitted from the main electric wire control unit 22 of the branch electric wire distributor 11 is set to Lo. Moreover, the third threshold value Tth3 and the fourth threshold value Tth4 are set to desired temperatures. At this time, if the diameter of the main electric wire 41 and a diameter of each of the branch electric wires 51-1 to 51-n are the same, then the third threshold value Tth3 may be equalized to the above-mentioned first threshold value Tth1, and the fourth threshold value Tth4 may be equalized to the second threshold value Tth2.

In Step S32, the branch electric wire control unit 32 determines whether or not the forcible shutoff signal to be transmitted from the main electric wire control unit 22 of the main electric wire distributor 11 is Lo. In the case where the forcible shutoff signal is not Lo (in the case where the forcible shutoff signal is Hi), the processing proceeds to Step S33. In the case where the forcible shut off signal is Lo, the processing proceeds to Step S34.

In Step S33, the branch electric wire control unit 32 shuts off all of the respective branch electric wire switches 31-1 to 31-*n*. That is to say, in the case where the overcurrent flows through the main electric wire 41, and the temperature of the main electric wire 41 reaches the first threshold value Tth1, then the branch electric wire control unit 32 shuts off all of the branch electric wire switches 31-1 to 31-*n*, and stops the electric power supply to the loads RL1 to RLn.

In Step S34, the branch electric wire control unit 32 determines whether or not the current is detected in the branch electric wire current sensor installed in the branch electric wire switch 31-1. In the case where the current is detected, the processing proceeds to Step S35. In the case where the current is not detected, the processing proceeds to Step S37.

In Step S35, the branch electric wire control unit 32 determines whether or not the target temperature (saturation temperature) of the branch electric wire 51-1 when the current detected by the branch electric wire current sensor 31S continuously flows through the branch electric wire 51-1 is the estimated temperature of the present moment or more. In this processing, by the temperature estimation logic in equations (1) to (3), the temperature of the branch electric wire 51-1 is estimated every predetermined sampling time, and it is determined whether or not the estimated temperature reaches the target temperature. In the case where it is determined that the target temperature is the estimated temperature of the present moment or more, the branch electric wire 51-1 generates heat from now on, and accordingly, the processing proceeds to Step S36. In the case where it is determined that the target temperature is less than the estimated temperature of the present moment, the branch electric wire 51-1 radiates heat from now on, and accordingly, the processing proceeds to Step S37.

In Step S36, by the above-mentioned temperature estimation logic, the branch electric wire control unit 32 executes heat generation processing toward the target temperature. That is to say, in the case where the target temperature is higher than the present estimated temperature, the temperature of the branch electric wire 51-1 rises in such a manner that the current flows through the branch electric wire 51-1, and accordingly, the branch electric wire control unit 32 executes the heat generation processing. Thereafter, the processing proceeds to Step S38.

In Step S37, by the above-mentioned temperature estimation logic, the branch electric wire control unit 32 executes heat radiation processing toward the target temperature. That is to say, in the case where the current does not flow through the branch electric wire 51-1 (in the case of NO in Step S34), or in the case where the present estimated temperature is higher than the target temperature when the current flows therethrough (in the case of NO in Step S35), the temperature of the branch electric wire 51-1 is lowered, and accordingly, the branch electric wire control unit 32 executes the heat radiation processing. Thereafter, the processing proceeds to Step S38.

In Step S38, the branch electric wire control unit 32 calculates the present estimated temperature, and stores the present estimated temperature in the memory (not illustrated) and the like. In such a way, the present temperature of the branch electric wire 51-1 can be estimated. Note that, in a similar way to this, also with regard to other branch electric wires 51-2 to 51-*n*, temperatures thereof can be estimated.

Thereafter, in Step S39, the branch electric wire control unit 32 determines whether or not the branch electric wire switch 31-1 provided in the branch electric wire distributor 12 is in a shutoff state. In the case where the branch electric wire switch 31-1 is not in the shutoff state (in the case where the branch electric wire switch 31-1 is in a connection state), the processing proceeds to Step S40. In the case where the branch electric wire switch 31-1 is in the shutoff state, the processing proceeds to Step S44.

In Step S40, the branch electric wire control unit 32 determines whether or not the estimated temperature of the branch electric wire 51-1 is lower than the third threshold value Tth3. In the case where it is determined that the estimated temperature of the branch electric wire 51-1 is lower than the third threshold value Tth3, the processing proceeds to Step S43. In the case where it is not determined that the estimated temperature of the branch electric wire 51-1 is lower than the third threshold value Tth3 (in the case where it is determined that the estimated temperature of the branch electric wire 51-1 is higher than the third threshold value Tth3), the processing proceeds to Step S41.

In Step S43, the branch electric wire control unit 32 sets, to Lo, the branch electric wire abnormality signal to be outputted to the main electric wire control unit 22 of the main electric wire distributor 11. Hence, an ON state of the main electric wire switch 21 provided in the main electric wire distributor 11 is maintained.

In Step S41, the branch electric wire control unit 32 determines whether or not the estimated temperature of the branch electric wire 51-1 is within a range higher than the third threshold value Tth3 and lower than the fourth threshold value Tth4. In the case where it is determined that the estimated temperature of the branch electric wire 51-1 is within this range, the processing proceeds to Step S42. In the case where it is not determined that the estimated temperature of the branch electric wire 51-1 is within this range (in the case where it is determined that the estimated temperature of the branch electric wire 51-1 is higher than the fourth threshold value Tth4), the processing proceeds to Step S44.

In Step S42, the branch electric wire control unit 32 performs the PWM control for the branch electric wire switch 31-1 connected to the branch electric wire 51-1, and reduces the current flowing through the branch electric wire 51-1. Thereafter, the processing proceeds to Step S43.

In Step S44, the branch electric wire control unit 32 sets, to Hi, the branch electric wire abnormality signal to be outputted to the main electric wire control unit 22 of the main electric wire distributor 11, and in addition, turns off the branch electric wire switch 31-1 of the branch electric wire distributor 12. Hence, in the main electric wire distributor 11, under control of the main electric wire control unit 22, there is performed control to change the first threshold value Tth1 and the second threshold value Tth2 to the modified first threshold value Tth1' and the modified second threshold value Tth2' (refer to Step S19 of FIG. 2), and in addition, in the branch electric wire distributor 12, the branch electric wire switch 31-1 is turned off by the control of the branch electric wire control unit 32. Thereafter, the processing proceeds to Step S45.

In Step S45, the branch electric wire control unit 32 determines whether or not the temperature of the branch electric wire 51-1 drops to the ambient temperature. In the case where the temperature of the branch electric wire 51-1 reaches the ambient temperature, the processing proceeds to Step S46. In the case where the temperature of the branch electric wire 51-1 does not reach the ambient temperature, the processing returns to Step S32, and the above-mentioned processing is repeated.

In Step S46, the branch electric wire control unit 32 changes the branch electric wire abnormality signal to Lo, and in addition, releases the shutoff of the corresponding branch electric wire switch 31-1 of the branch electric wire distributor 12. As a result, in the main electric wire control unit 22 of the main electric wire distributor 11, there is performed processing for returning the modified first threshold value Tth1' and the modified second threshold value Tth2' to the first threshold value Tth1 and the second threshold value Tth2.

In such a way, in the case where the overcurrent is generated in the branch electric wire 51-1, and the temperature of the branch electric wire 51-1 rises to reach the third threshold value Tth3, then the branch electric wire switch 31-1 is subjected to the PWM control, whereby the current flowing through the branch electric wire 51-1 is reduced, and in the case where the electric wire temperature further rises thereafter to reach the fourth threshold value Tth4, the branch electric wire switch 31-1 is shut off. Hence, in the case where the overcurrent is generated, a rising rate of the electric wire temperature can be suppressed, and a time until the load RL1 is shut off can be extended. Note that, though the description has been made above of the operations of the branch electric wire 31-1 as an example, the branch electric wire switches 31-2 to 31-n also operate in a similar way.

Figure 5:
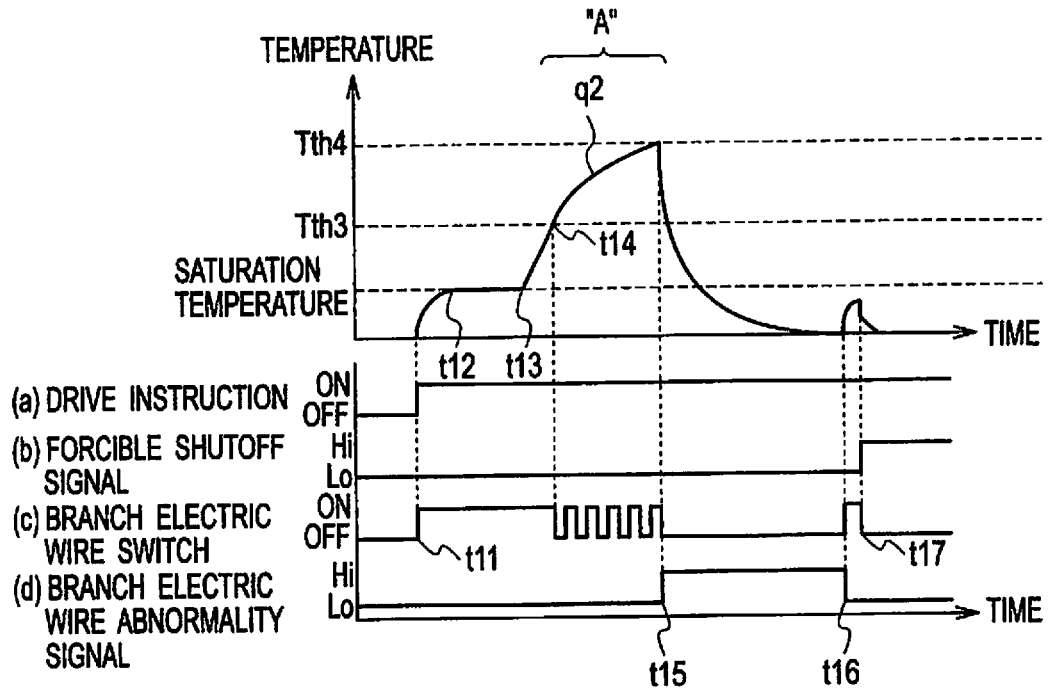
FIG. 5 is a timing chart illustrating operations of respective instruments when an overcurrent flows through the branch electric wire mounted on the vehicle electric power distribution device according to the embodiment.
Figure 6:
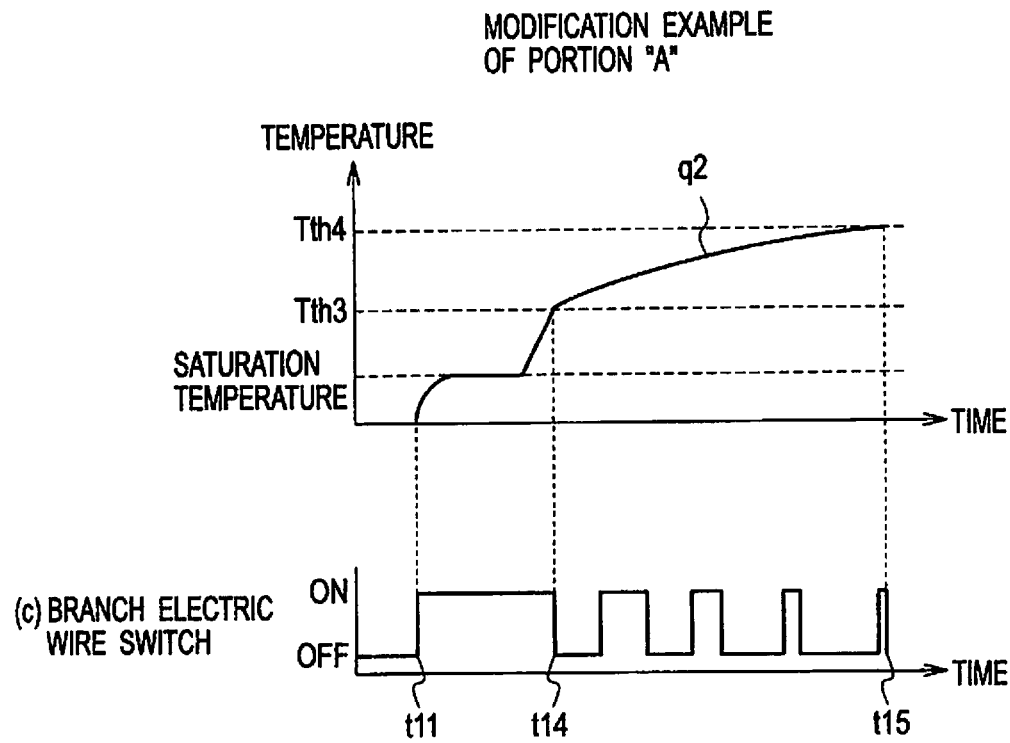
FIG. 6 is a timing chart illustrating operations of respective instruments when an overcurrent flows through a branch electric wire mounted on a vehicle electric power distribution device according to a modification example.

Next, a description is made of operations of the branch electric wire control unit 32 and branch electric wire switch 31-1 of the branch electric wire distributor 12 with reference to timing charts illustrated in FIGS. 5 and 6. As illustrated in a waveform (a) of FIG. 5, a drive instruction for the branch electric wire switch 31-1 is inputted at a time t11, then the branch electric wire switch 31-1 turns on as illustrated in a waveform (c) of FIG. 5, the load current flows through the branch electric wire 51-1, and the temperature of the branch electric wire 51-1 starts to rise (refer to a curve q2). Then, the temperature of the branch electric wire 51-1 reaches the saturation temperature at a time t12, and the temperature concerned is stabilized at the saturation temperature. The saturation temperature does not reach the third threshold value Tth3, and accordingly, the branch electric wire abnormality signal becomes Lo (refer to Step S43 of FIG. 3).

Thereafter, at a time t13, the short circuit accident or the like occurs in the branch electric wire 51-1, and the current flowing through the branch electric wire 51-1 is suddenly increased. Then, following this, the temperature of the branch electric wire 51-1 rises. As a result, at a time t14, the estimated temperature of the branch electric wire 51-1 reaches the third threshold value Tth3. Then, as illustrated in a waveform (c) of FIG. 5, the branch electric wire switch 31 executes the PWM control (refer to Step S42 of FIG. 3). Hence, after the time t14, a gradient of the temperature curve q2 is lowered a little.

Then, when the time further elapses, and the estimated temperature of the branch electric wire 51-1 reaches the fourth threshold value Tth4 at a time t15, then the branch electric wire switch 31-1 is turned off as illustrated in the waveform (c) of FIG. 5. Hence, the current stops flowing through the branch electric wire 51-1, and accordingly, the estimated temperature of the branch electric wire 51-1 starts to drop. Moreover, as illustrated in a waveform (d) of FIG. 5, the branch electric wire abnormality signal is switched from Lo to Hi. As a result, the main electric wire control unit 22 of the main electric wire distributor 11 changes the first threshold value Tth1 and the second threshold value Tth2 to the modified first threshold value Tth1' and the modified second threshold value Tth2'. Therefore, the main electric wire 41 is changed so as to be shut off at a lower temperature.

Thereafter, when the temperature of the branch electric wire 51-1 is lowered to the ambient temperature at a time t16, then as illustrated in the waveform (c) of FIG. 5, the branch electric wire switch 31-1 is turned on, and in addition, as illustrated in a waveform (d) of FIG. 5, the branch electric wire abnormality signal is set to Lo (refer to Step S46 of FIG. 3).

Then, for example, as illustrated in a waveform (b) of FIG. 5, in the case where the forcible shutoff signal is transmitted from the main electric wire control unit 22 of the main electric wire distributor 11 at a time t17, the branch electric wire switch 31-1 is shut off instantaneously. As a result, the temperature of the branch electric wire 511 is lowered to the ambient temperature.

As described above, in the branch electric wire distributor 12, in the case where the temperature of the branch electric wire 51-1 reaches the third threshold value Tth3, the branch electric wire switch 31-1 is subjected to the PWM control, whereby the temperature rise of the branch electric wire 51-1 is suppressed. Therefore, the drive of the load RL1 connected to the branch electric wire 51-1 can be allowed to continue. Thereafter, in the case where the temperature of the branch electric wire 51-1 reaches the fourth threshold value Tth4, the branch electric wire switch 31-1 is shut off. Therefore, the branch electric wire 51-1 and the load RL can be protected from the temperature rise.

Note that, in the above-mentioned embodiment, the description has been made of such an example where the branch electric wire switch 31-1 is subjected to the PWM control in a predetermined duty ratio in the case where the temperature of the branch electric wire 51-1 reaches the third threshold value Tth3; however, the duty ratio may be gradually lowered as illustrated in a modification example of a portion "A" in FIG. 6. That is to say, the PWM control is performed during a period from the time t14 to the time t15, and the duty ratio in this event is gradually reduced, whereby it becomes possible to further suppress the temperature rise of the branch electric wire 51-1.

In such a manner as described above, in the vehicle electric power distribution device 100 according to this embodiment, the first threshold value Tth1 and the second threshold value Tth2 are set for the upper limit temperature of the main electric wire 41, and in addition, the third threshold value Tth3 and the fourth threshold value Tth4 are set for the upper limit temperature of the branch electric wires 51-1 to 51-n. Then, in the case where the temperature of the main electric wire 41 exceeds the first threshold value Tth1, then the forcible shutoff signal is set to Hi, all of the respective branch electric wire switches 31-1 to 31-n provided in the branch electric wire distributor 12 are shut off, and the loads RL1 to RLn are stopped, whereby the whole of the circuit is protected. Thereafter, in the case where the temperature of the main electric wire 41 further rises to reach the second threshold value Tth2, the main electric wire switch 21 is shut off, and the supply of the electric power to the main electric wire 41 is stopped. Hence, in the case where the temperature of the main electric wire 41 rises, then the branch electric wire switches 31-1 to 31-n of the branch electric wires 51-1 to 51-n are first shut off, and thereafter, the main electric wire switch 21 of the main electric wire distributor 11 is shut off. As a result, the respective electric wire switches 31-1 to 31-n can be surely turned to the OFF state, and the whole of the vehicle electric power supply device 100 can be stopped.

Moreover, in the case where the temperature of the branch electric wire 51-1 rises to exceed the third threshold value Tth3, then the branch electric wire switch 31-1 connected to the branch electric wire 51-1 is subjected to the PWM control, and the current flowing through the branch electric wire 51-1 is lowered. Therefore, a sudden temperature rise of the branch electric wire 51-1 can be suppressed, and the load RL1 can be driven for a longer time. Moreover, a lifetime of the branch electric wire 51-1 can be extended.

Furthermore, in the case where the temperature of the branch electric wire 51-1 to reach the fourth threshold value Tth4, then the branch electric wire switch 31-1 is shut off, and in addition, the branch electric wire abnormality signal to be transmitted to the main electric wire distributor 11 is switched to Hi, and the first threshold value Tth1 and the second threshold value Tth2 in the main electric wire distributor 11 are changed to the modified first threshold value Tth1' and the modified second threshold value Tth2', which are lower than usual. Hence, in the case where the temperature of the branch electric wire 51-1 rises, then the main electric wire 41 is shut off at the lower temperature, and for the temperature rise of the main electric wire 41, the main electric wire switch 21 is shut off at an earlier point of time, whereby the whole of the circuit can be protected from the overheat. As a result, the diameters of the main electric wire 41 and the branch electric wires 51-1 to 51-*n* can be thinned, and this can contribute to weight reduction of the vehicle.

Moreover, the configuration of this embodiment can be employed in the case where ON/OFF timing of each of the loads is unknown when one fuse is not provided for one load but one fuse is made to correspond to a plurality of loads. Accordingly, the configuration of this embodiment is rich in versatility. Furthermore, an influence by external noise can be reduced. Furthermore, a mechanical fuse is unnecessary, and accordingly, a degree of freedom in design and adaptability to an installation spot can be enhanced.

The description has been made above of the electric power distribution device of the present invention based on the illustrated embodiment; however, the present invention is not limited to this, and the configurations of the respective portions can be replaced by arbitrary configurations having similar functions.

For example, in the above-described embodiment, the description has been made of the PWM control as an example of the electric power consumption reduction control; however, the present invention is not limited to this, and for example, it is also possible to employ a method for reducing the electric power consumption by changing the voltage to be outputted to the load.

INDUSTRIAL APPLICABILITY

The present invention can be used for suitably switching on and off the electronic switch in response to the heat generation of the electric wires in the electric power distribution device including the main electric wire distributor and the branch electric wire distributor.

The invention claimed is:

1. An electric power distribution device for distributing electric power of a battery to a plurality of branch electric wires and supplying the electric power to loads connected to subsequent stages of the respective branch electric wire, comprising:
    a main electric wire distributor for distributing, to a plurality of main electric wires, the electric power supplied from a DC power supply, the main electric wire distributor being connected to the DC power supply, comprising
    first current sensors for detecting currents flowing through the respective main electric wires,
    first switches for switching connection and shutoff of the respective main electric wires, and
    a first control unit for estimating a temperature of each of the main electric wires by the current detected by each of the first current sensors, and controlling each of the first switches based on the estimated temperature;
    a branch electric wire distributor for distributing the electric power to the plurality of branch electric wires, the branch electric wire distributor being connected to the respective main electric wires, comprising
    second current sensors for detecting currents flowing through the respective branch electric wires,
    second switches for switching connection and shutoff of the respective branch electric wires, and
    a second control unit for estimating a temperature of each of the branch electric wires by the current detected by each of the second current sensors, and controlling each of the second switches based on the estimated temperature; and
    a communication line for performing communication between the first control unit and the second control unit, wherein
    the first control unit
    sets a second threshold value that defines an upper limit temperature of the main electric wires, and a first threshold value as a value lower than the second threshold value,
    transmits a forcible shutoff signal to the second control unit in a case where the estimated temperature of each of the main electric wires exceeds the first threshold value, and
    performs control to shut off each of the first switches in a case where the estimated temperature of each of the main electric wires exceeds the second threshold value, and
    the second control unit
    sets a fourth threshold value that defines an upper limit temperature of the branch electric wires, and a third threshold value lower than the fourth threshold value,
    performs electric power reduction control for each of the second switches and supplies the electric power to each of the branch electric wires in a case where the estimated temperature of each of the branch electric wires exceeds the third threshold value, and
    shuts off each of the second switches in a case where the estimated temperature of each of the branch electric wires exceeds the fourth threshold value, or in a case where the forcible shutoff signal is transmitted.

2. The electric power distribution device according to claim 1, wherein
    the electric power consumption reduction control is PWM control to supply the electric power to the branch electric wires in a desired duty ratio.

3. The electric power distribution device according to claim 2, wherein
    the second control unit reduces the duty ratio with elapse of a time at a time of implementing the PWM control.

4. The electric power distribution device according to claim 1, wherein
    the second control unit transmits a branch electric wire abnormality signal to the first control unit in the case where the estimated temperature of each of the branch electric wires exceeds the fourth threshold value, and
    the first control unit lowers the first threshold value and the second threshold value in a case of receiving the branch electric wire abnormality signal.

5. The electric power distribution device according to claim 2, wherein
    the second control unit transmits a branch electric wire abnormality signal to the first control unit in the case where the estimated temperature of each of the branch electric wires exceeds the fourth threshold value, and the first control unit lowers the first threshold value and the second threshold value in a case of receiving the branch electric wire abnormality signal.

6. The electric power distribution device according to claim 3, wherein the second control unit transmits a branch electric wire abnormality signal to the first control unit in the case where the estimated temperature of each of the branch electric wires exceeds the fourth threshold value, and the first control unit lowers the first threshold value and the second threshold value in a case of receiving the branch electric wire abnormality signal.

\* \* \* \* \*